United States Patent Office 2,754,240
Patented July 10, 1956

2,754,240

CASEIN ADHESIVE COMPOSITION AND LAMINATED STRUCTURE UTILIZING THE SAME

Walter B. Kinney, Bainbridge, N. Y., assignor to The Borden Company, New York, N. Y., a corporation of New Jersey No Drawing. Application May 3, 1951,
Serial No. 224,451

13 Claims. (Cl. 154—141)

This invention presents a new adhesive which is especially adapted for cementing metal to cellulosic materials; which has a good green strength, a very high dry strength, and an excellent wet strength; and which is prepared from casein containing materials in the presence of amounts of fluorine compounds sufficient to produce a significant acidity in the mixture.

Casein has long been used as an adhesive and as a binder, particularly for gluing wood and as a base for preparing coating compounds for paper, and for these purposes it has been found to be efficient and highly satisfactory. It does not, however, show much, if any, adhesive properties when applied to metals and it has not been successfully used as an adhesive between cellulosic materials such as paper or cloth and metals such as aluminum foil, in keeping with the general theory of adhesion that wood is hydrophilic and metal is hydrophobic.

The present invention provides an adhesive containing significant amounts of casein to which there may be added emulsions of a wide range of high molecular weight organic materials such as natural and synthetic rubber, various of the synthetic and natural resins, and the like, containing also a significant amount of a fluorine compound or fluorine salt, such as to produce, simultaneously, a good solubility of the casein in water and high adhesivity of the casein-containing cement to metal surfaces, to cellulosic surfaces, and to glass, rubber, leather, and cloth. In practicing the invention the casein is prepared in solution in any convenient way, preferably by slurrying in water and heating with stirring until dissolved with a suitable alkali, and to this solution there is then added, at an appropriate stage, an excess of fluorine salts sufficient to provide a liberal excess over the amount which will combine with the casein. This mixture may also contain considerable quantities of other organic compounds whether soluble or insoluble in water. Particularly advantageous are significant amounts of an emulsion of natural rubber in water. Almost as effective are significant amounts of substantially any of the synthetic rubbers, including the styrene-butadiene material known alternatively as Buna S, or GR–S, or by various other names; also synthetic elastomers such as neoprene, butadiene-acrylonitrile copolymers, polyacrylates, polyethylene, butyl, polybutene, and styrene-butadiene polymers including the high styrene, low butadiene types; or the ethylene polysulfide polymer (Thiokol) prepared from ethylene chloride and sodium polysulfide known in the trade as Thiokol. These materials are preferably dispersed or emulsified in water and the resulting colloidal suspension incorporated in the casein-fluoride material. This fluoride type casein solution also functions well as an emulsifier, and some hard-to-emulsify polymers such as polyethylene can be emulsified with the aid of this particular casein solution. Various of the non-elastomeric synthetic resins may likewise be used, preferably in emulsion form, including the various vinyl resins, the urea-formaldehyde resins, the phenol-formaldehyde resins, the melamine resins, rosin and rosin esters, coumarone resins, vinsol, and ammonia solutions of phenolic resins, and the like. This casein solution, being on the acid side, is particularly valuable for use with high acid resins such as rosin, vinsol, etc. where the avoidance of soap formation is desired. Furthermore, when emulsions or latices which are on the alkaline side are blended with the acid casein solution, the pH of the complete mixture is brought down from the alkaline to the acid side thus destroying some of the soap in the latices in making for better water-resistance, stability and other properties.

In the preparation of this adhesive, there is first prepared a normal casein solution at a pH of about 7.5 to 9.5, and this is then made acid by the addition of a fluoride salt such as ammonium fluoride or, better, ammonium silicofluoride, or zinc silicofluoride, or magnesium silicofluoride. Such compounds as sodium fluoride, potassium fluoride, or ammonium fluoborate may also be used. The quantity of fluoride salt added should be sufficient to bring the pH down to a point within the range between about 5.2 and 6.0. To this solution there can be added the high molecular weight resin emulsion which, as above indicated, may be almost any of the natural or synthetic resinous or elastomeric polymers. These emulsions are either on the alkaline or the acid side, and the casein remains in solution in spite of the relatively highly acid character of the continuous phase.

The resulting composition shows an excellent stability, much less foaming than most adhesives, good machining properties, and excellent adhesion to metal surfaces such as aluminum. In addition, relatively high acid number resins may be emulsified and added to the casein solution without saponification of the resin acid. Also, excellent pigment binding properties are shown. The adhesive also shows a thin body (a low viscosity) at a high solids content and the very unusual and valuable property of excellent adhesivity both dry and wet to metal surfaces, especially aluminum foil. In consequence, the adhesive when applied to paper and foil shows a good immediate green strength, shows an exceedingly high strength when it has been dried, and in addition maintains a good adhesive strength upon re-wetting.

The adhesive thus is particularly valuable for the production of foil and paper combinations for the wrapping of food products since the laminated paper-foil sheet withstands handling and folding very well, adheres quickly and satisfactorily, and yields a very stout bond when dried, and the bond does not deteriorate significantly when the paper is re-wetted.

Thus, the invention provides a new and useful adhesive particularly suitable for the production of paper-foil laminates and for other adhesive uses by the steps of dissolving casein at its normal alkalinity, and then acidifying the casein solution without precipitation of the casein by the addition of a wide range of fluoride single and complex salts to which there may be added, if desired, emulsions of a wide range of solid resins of both elastomeric and brittle types. Other objects and details of the invention will be apparent from the following description.

In preparing the cement of the present invention there is first produced a solution of casein at an appropriate alkalinity. This solution is preferably prepared from precipitated and washed casein and it does not appear that there is any significant difference, in this process, between rennet casein and acid precipitated casein although the absence of calcium in the acid precipitated casein may in some instances be helpful. The solution is conveniently accomplished by mixing the casein and water in the presence of sufficient alkaline material to bring the pH to a point within the range between 7.5 and 9.5. This may be accomplished by the use of small quantities of caustic alkali, such as caustic soda, or by the use of somewhat larger amounts of ammonia, or by the use of borax, or the like. When the casein is satisfactorily dissolved, the fluoride salt may be added, and added in an amount sufficient to bring the pH onto the acid side within the range between about 5.2 and 6.0. The preferred material for this purpose is ammonium silicofluoride with zinc silicofluoride perhaps about as desirable. Equally good results are obtainable with ammonium fluoride or magnesium silicofluoride or other soluble fluorides or even other complex soluble fluorides. To this mixture there may then be added one or more of a wide range of solid high molecular weight materials, preferably insoluble and in emulsion form, such as natural rubber latex, Buna latex, Perbunan latex, or the like. Alternatively, emulsions or suspensions of high polymers or resins such as polyvinyl acetate or polyacrylates, copolymers of vinyl chloride and vinylidene chloride, or resins such as vinsol resin, polyethylene, and the like may be made using the casein solution as the emulsifier. As so prepared, the adhesive shows an excellent shelf life and a very high stability, is easy to reproduce in fresh mixtures, and shows an excellent adhesive strength both to cellulosic materials and metals when dry, and substantially as good adhesiveness when re-wetted.

It is found that there is a critical value, or an inflection point, or a change in characteristics and properties, when the pH goes below 6.0, and it is this observation upon which the present invention is based. The method of operation is not wholly understood. The fact merely appears that, when sufficient fluoride salt is added to reduce the pH below the critical value, a number of simultaneous interactions occur. In the first place, the fluidity or viscosity is sharply changed and significantly reduced. This fact suggests either a change in hydration of the casein, or perhaps a change in agglomeration of the protein molecules making up the casein, or even perhaps a change in molecular weight of the casein molecules. Not only is the body or viscosity of the casein solution profoundly altered below the critical value of acidity, as obtained by the presence of the fluoride salt, but a good solution or dispersion in water is maintained in spite of the existence therein of an acidity which is sometimes sufficient to precipitate the casein. That is, a low viscosity casein solution of high acidity is most unexpected and has not previously been produced by any previously known composition of matter containing casein. Furthermore, a profound change in surface tension is produced, such that little, if any, frothing or foaming occurs, in which respect this casein solution is profoundly different, and different in order of magnitude, from any previously made casein solutions. Casein solutions are known which have a pH on the acid side, that is, from 5.6 to 6.6. However, these previously known casein solutions are generally characterized by low binding strength as compared with solutions made on the alkaline side, but the casein solution as described here has much stronger binding strength than previously known casein solutions made on the acid side. Also, the casein solution itself is extremely stable, being resistant to mold, fungi, putrefaction, and hydrolysis. Yet, in spite of the profound differences in physical properties and chemical composition, the material remains an excellent adhesive. In spite of its low body and low surface tension, it sticks promptly and shows a good immediate adhesiveness. And when dried down it shows an adhesive strength equal to or superior to the best previously made casein glues as between organic materials. In addition, this adhesiveness is maintained as between cellulosic or the like and metal surfaces, especially aluminum and the like. And last but not least, the adhesive bond, whether between cellulosic materials or to a metal, is maintained when moisture is added to the joint. This combination of properties is broadly new and most unexpected and is found to turn simply upon the addition of at least a critical amount of fluorine compound sufficient to bring the pH below the critical value of 6.0, and it is most unexpected to find this combination of properties obtainable by this single simple step.

The procedure of the invention is well shown in the following examples, in which all parts are by weight:

*Example 1*

A casein solution was prepared by stirring 100 parts by weight of casein into 310 parts by weight of clear water containing 1.8 parts by weight of an alkali such as magnesium hydrate. Then the mixture was heated to 120° F., and when hot 2.5 parts by weight of ammonia were added. After heating to 180° F., 5 parts of ammonium silicofluoride were added, after being dissolved in water in amount three times the weight of the silicofluoride. This material makes a rather thick, heavy-bodied, viscous casein solution. To this material there may then be added, if desired, a suspension of a high molecular weight resin. In the present example this is preferably shown as natural rubber latex which may be added in an amount from 100 parts to 800 parts by weight per 100 parts of casein. The addition of the fluorine compound sharply reduced the body of the material and very greatly reduced its foaming tendencies. The abovementioned components thus consist of the following items:

| | |
|---|---|
| Casein | 100 |
| Water | 445 |
| Alkali | 4.3 |
| Natural rubber latex | 450 |
| Ammonium silicofluoride | 5 |

This material was then applied in the usual way to a sheet of aluminum foil, against which there was then applied a sheet of paper. The composite pair were rolled into contact lightly and dried quickly by heat. Immediately upon cooling, the foil was torn from the paper by peeling sharply back upon itself. Excellent paper fibre failure was observed. The laminated sheet was then immersed in water at room temperature for 72 hours; upon peeling the foil back upon itself again, heavy wet paper fibre failure was obtained.

*Example 2*

A similar mixture utilizing ammonium silicofluoride and a polyvinyl acetate polymer emulsion with the casein-water composition was prepared, as follows:

| | |
|---|---|
| Casein | 100 |
| Water | 445 |
| Alkali | 4.3 |
| Ammonium silicofluoride | 5 |
| Polyvinyl acetate emulsion | 675 |

This formula was used in bonding birch and poplar plywood, showing high initial and aged strengths, as well as very good results with paper and foil.

*Example 3*

An analogous mixture was prepared utilizing zinc silicofluoride and a latex of butadiene-styrene copolymer in the casein solution, as follows:

| | |
|---|---|
| Casein | 100 |
| Water | 445 |
| Alkali | 4.3 |
| Zinc silicofluoride | 5 |
| Butadiene-styrene copolymer latex | 450 |

This composition also showed an excellent dry and wet strength between paper and foil and between various types of wood members.

Example 4

Still another mixture utilizing magnesium silicofluoride and a latex of the butadiene-acrylonitrile copolymer was prepared, as follows:

| | |
|---|---|
| Casein | 100 |
| Water | 445 |
| Alkali | 4.3 |
| Magnesium silicofluoride | 5 |
| Butadiene-acrylonitrile copolymer latex | 450 |

This material likewise showed an excellent dry and wet strength when used as a cement between paper and foil, and showed a high efficiency in gluing procedures generally.

Example 5

The composition without polymer emulsions is an excellent adhesive for paper and may be prepared as follows:

| | |
|---|---|
| Casein | 100 |
| Water | 445 |
| Alkali | 4.3 |
| Ammonium silicofluoride | 5 |

The above formulation was used to glue two sheets of wet strength paper together such as bleached white kraft, Quillon treated kraft, or any other type of wet strength paper as used in multi-wall paper bags. After aging at room temperature 24 hours, the glued assembly was immersed in 80° F. water for 24 hours. Upon tearing apart, 100 per cent paper fibre failure was observed.

Example 6

Interesting and valuable results are obtainable by the use of mixed emulsions. A composition was prepared utilizing vinsol resin solution with GR-S latex, as follows:

| | |
|---|---|
| Casein | 100 |
| Water | 662 |
| Alkali | 4.3 |
| Ammonium silicofluoride | 5 |
| Vinsol resin solution | 760 |
| GR-S latex (40% solids) | 766 |

The casein, water, alkali, and fluoride were made into solution as before stated, and the vinsol resin solution was emulsified by stirring into the casein dispersion; then the latex was added. This composition satisfactorily passed Joint Army-Navy Specification JAN-P-140, which requires that two pieces of waterproof paper, glued together, must withstand water penetration for eight hours.

Example 7

An excellent simple formula of high strength both wet and dry suitable for general gluing purposes is:

| | |
|---|---|
| Casein | 100 |
| Water | 445 |
| Alkali | 4.3 |
| Zinc silicofluoride | 3 |

Example 8

Another excellent general purpose adhesive is:

| | |
|---|---|
| Casein | 100 |
| Water | 445 |
| Alkali | 4.3 |
| Ammonium fluoride | 6 |
| Neoprene latex | 650 |

Adhesives such as those listed above can be used for gluing to numerous types of surfaces, such as cellophane, glassine, paint, leather, glass, plastics, paper, etc.

Example 9

| | |
|---|---|
| Casein | 100 |
| Water | 445 |
| Alkali | 4.3 |
| Polyacrylated latex | 450 |
| Ammonium silicofluoride | 5 |

The above composition was prepared as described above, and it was then formulated into a paper coating composition as follows:

| | |
|---|---|
| Solution of casein, alkali, latex, and fluoride in water compounded as shown at the beginning of Example 9 | 450 |
| Water | 470 |
| Calgon (sodium hexa meta phosphate) | 7.5 |
| Antifoam (silicone emulsion) | 6.7 |
| Clay | 1000 |

The Calgon and Antifoam are added to the water, then the casein solution is added. After thorough mixing, the clay is mixed in until smooth. This composition was then used in the usual manner to coat paper as is or diluted slightly with water, giving an excellent appearing clay-coated paper having exceptionally high strength, good flexibility, and excellent appearance.

Example 10

| | |
|---|---|
| Casein | 100 |
| Alkali | 4.5 |
| Urea | 87.5 |
| Ammonium silicofluoride | 5 |
| Water | 214 |

The above composition can be successfully used in gluing paper labels to bottles to withstand immersion in room temperature water without falling off. It will be noted that there is no insolubilizing agent for the casein present in the above formula. The pH is 5.65.

Thus, the process of the invention yields an acid solution of casein in which the acid character reduces the viscosity, reduces the surface tension and foaming tendency, and produces a high adhesiveness to metal surfaces while maintaining the inherent adhesive strength of a good casein glue to yield a wide range of types of glued structures.

The invention claimed is:

1. A casein adhesive comprising, in combination, casein, water, an alkaline solubilizing agent for the casein, and a fluorine compound soluble in the mixture in an amount sufficient to bring the pH below the critical value of 6.0.

2. A casein adhesive comprising, in combination, casein, water, a sufficient amount of an alkaline compound to dissolve the casein in the water, and a water soluble fluoride in a solution of pH within the range 5.2–6.

3. A laminated structure comprising a casein adhesive between the respective laminae, the casein adhesive comprising, in combination, casein, water, an alkaline substance in sufficient amount to dissolve the casein in the water and a sufficient amount of a fluorine salt which is soluble in the mixture to bring the pH of the solution below the critical value of 6.0, the water being subject to evaporation from the solution to yield a solid adhesive which is strongly adherent to both laminae.

4. A reinforced metal foil structure comprising a portion of metal foil as a first lamina and a cellulose-containing material as a second lamina with interposed adhesive therebetween comprising casein, water, a sufficient amount of an alkaline substance to dissolve the casein in the water, and a sufficient amount of a fluorine salt to bring the pH value of the water solution of adhesive below the critical value of 6.0.

5. A foil-paper structure comprising, in combination, an aluminum foil member and a paper sheet member wi an interposed adhesive therebetween which is strongly adhesive to both foil and paper, comprising, in combination, casein, water, a sufficient amount of an alkaline substance to dissolve the casein and a water soluble silicofluoride salt, at a pH within the range about 5.2–6, and an aqueous emulsion of a material selected from the group consisting of natural rubber, styrene-butadiene copolymer, neoprene, butadiene-acrylonitrile copolymer, polyacrylates, polyethylene, butyl rubber, polybutene, styrene-butadiene polymer, ethylene polysulfide polymer, and polyvinyl acetate.

6. A foil-paper structure comprising, in combination, a copper foil member and a paper sheet member with an interposed adhesive therebetween which is strongly adhesive to both foil and paper, comprising, in combination, casein, water, a sufficient amount of an alkaline substance to dissolve the casein and a sufficient amount of a fluorine salt, soluble in the mixture to bring the pH of the water solution below the critical value of 6.0.

7. A foil-paper structure comprising, in combination, a tin foil member and a paper sheet member with an interposed adhesive therebetween which is strongly adhesive to both foil and paper, comprising, in combination, casein, water, a sufficient amount of an alkaline substance to dissolve the casein and a sufficient amount of a fluorine salt, soluble in the mixture to bring the pH of the water solution below the critical value of 6.0.

8. A casein adhesive composition showing the property of strong adhesion to both metal and cellulose, comprising, in combination, casein, water, sufficient non-precipitating alkali to dissolve the casein in water and a sufficient amount of ammonium fluoride to bring the pH of the solution below a critical value of 6.0.

9. A casein adhesive composition showing the property of strong adhesion to both metal and cellulose, comprising, in combination, casein, water, a sufficient alkali to dissolve the casein in water and a sufficient amount of zinc silico fluoride, to bring the pH of the solution below the critical value of 6.0.

10. A casein adhesive composition showing the property of strong adhesion to both metal and cellulose, comprising, in combination, casein, water, sufficient alkali to dissolve the casein in water and a sufficient amount of magnesium silico fluoride to bring the pH of the solution below the critical value of 6.0.

11. A casein adhesive composition comprising, in combination, casein, water, an alkaline solubilizing agent for the casein, selected from the group consisting of caustic soda, caustic potash, ammonia and borax, in an amount sufficient to cause solution of the casein in the water, and a fluorine compound soluble in the mixture, selected from the group consisting of ammonium fluoride, ammonium silico fluoride, zinc silico fluoride, magnesium silico fluoride and ammonium fluoro borate, in an amount sufficient to bring the acidity below the critical value of 6.0.

12. A casein adhesive composition comprising the combination of casein, water, an alkaline solubilizing agent for the casein in amount sufficient to cause solution of the casein in the water, and a water soluble fluoride salt, at a pH below approximately 6, and an admixed aqueous emulsion of a material selected from the group consisting of natural rubber, styrene-butadiene copolymer, neoprene, butadiene-acrylonitrile copolymer, polyacrylates, polyethylene, butyl rubber, polybutene, styrene-butadiene polymer, ethylene polysulfide polymer, and polyvinyl acetate.

13. A casein adhesive composition comprising the combination of casein, water, an alkaline solubilizing agent for the casein in amount sufficient to cause solution of the casein in the water, and a water soluble silicofluoride, at a pH below approximately 6, and an admixed aqueous emulsion of neoprene.

References Cited in the file of this patent

UNITED STATES PATENTS

| | | |
|---|---|---|
| 1,124,114 | Davis et al. | Jan. 5, 1915 |
| 1,213,926 | McManus | Jan. 30, 1917 |
| 1,376,737 | Tscheike | May 3, 1921 |
| 1,506,081 | Regnier | Aug. 26, 1924 |
| 1,604,310 | Prestholdt | Oct. 26, 1926 |
| 1,845,569 | Teague | Feb. 16, 1932 |
| 1,852,447 | Chapman et al. | Apr. 5, 1932 |
| 1,893,608 | Atwood | Jan. 10, 1933 |
| 2,023,389 | Iddings | Dec. 3, 1935 |
| 2,127,298 | Isaacs | Aug. 16, 1938 |
| 2,192,318 | Kirby | May 5, 1940 |
| 2,469,894 | Rogers | May 10, 1949 |

FOREIGN PATENTS

| | | |
|---|---|---|
| 175,556 | Great Britain | Feb. 23, 1922 |

OTHER REFERENCES

Seifensieder Ztng., vol. 60, pp. 732 to 733 (1939).